United States Patent
Takagi et al.

(10) Patent No.: US 10,745,508 B2
(45) Date of Patent: Aug. 18, 2020

(54) SURFACE-MODIFIED METAL OXIDE PARTICLES, PRODUCTION METHOD, DISPERSION LIQUID, CURABLE COMPOSITION, AND CURED PRODUCT

(71) Applicant: AGC Inc., Chiyoda-ku (JP)

(72) Inventors: Keisuke Takagi, Chiyoda-ku (JP); Jun Yoshida, Chiyoda-ku (JP); Hidenobu Murofushi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 41 days.

(21) Appl. No.: 16/001,317

(22) Filed: Jun. 6, 2018

(65) Prior Publication Data

US 2018/0282465 A1 Oct. 4, 2018

Related U.S. Application Data

(63) Continuation of application No. PCT/JP2016/088514, filed on Dec. 22, 2016.

(30) Foreign Application Priority Data

Dec. 25, 2015 (JP) ................... 2015-254093

(51) Int. Cl.
| | | |
|---|---|---|
| *C08F 292/00* | (2006.01) | |
| *C08G 77/24* | (2006.01) | |
| *C08G 77/20* | (2006.01) | |
| *C07F 7/18* | (2006.01) | |
| *C09C 1/36* | (2006.01) | |
| *C09C 3/12* | (2006.01) | |
| *C09D 183/08* | (2006.01) | |
| *C07F 7/28* | (2006.01) | |
| *G02B 1/04* | (2006.01) | |

(52) U.S. Cl.
CPC .......... *C08F 292/00* (2013.01); *C07F 7/1804* (2013.01); *C07F 7/1892* (2013.01); *C07F 7/28* (2013.01); *C08G 77/20* (2013.01); *C08G 77/24* (2013.01); *C09C 1/3684* (2013.01); *C09C 3/12* (2013.01); *C01P 2006/60* (2013.01); *C09D 183/08* (2013.01); *G02B 1/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,484,675 A | * | 1/1996 | Tripp ................. | C09C 1/56 430/108.7 |
| 5,618,872 A | * | 4/1997 | Pohl ................. | C01B 33/18 524/430 |
| 9,284,419 B2 | * | 3/2016 | Doshi ................. | B82Y 30/00 |
| 9,856,361 B2 | * | 1/2018 | Otsuka ................. | C09C 3/12 |
| 2005/0154086 A1 | * | 7/2005 | Yoneyama ............. | C08K 9/06 523/213 |
| 2009/0004098 A1 | | 1/2009 | Schmidt et al. | |
| 2009/0130306 A1 | * | 5/2009 | Yoo ................. | C09C 1/3081 427/220 |
| 2009/0206499 A1 | * | 8/2009 | Whitesides ............. | B82Y 30/00 264/4.1 |
| 2010/0021712 A1 | * | 1/2010 | Katayama ............. | B82Y 30/00 428/221 |
| 2011/0003130 A1 | | 1/2011 | Marchet et al. | |
| 2011/0237703 A1 | | 9/2011 | Nomoto et al. | |
| 2012/0049125 A1 | * | 3/2012 | Du ................. | C08F 20/24 252/500 |
| 2013/0164444 A1 | * | 6/2013 | Tokumitsu ........... | C01G 23/053 427/219 |
| 2014/0295341 A1 | * | 10/2014 | Fomitchev ......... | G03G 9/09716 430/108.22 |

FOREIGN PATENT DOCUMENTS

| | | |
|---|---|---|
| JP | 10-316406 | 12/1998 |
| JP | 2004-43285 | 2/2004 |
| JP | 2004-292282 | 10/2004 |
| JP | 2008-120605 | 5/2008 |
| JP | 2008-515747 | 5/2008 |
| JP | 2009-143974 | 7/2009 |
| JP | 2011-514395 | 5/2011 |
| JP | 2011-136857 | 7/2011 |
| JP | 2014-114194 | 6/2014 |
| JP | 2014-237576 | 12/2014 |
| JP | 2015-78339 | 4/2015 |
| JP | 2015-78341 | 4/2015 |
| JP | 2015-140413 | 8/2015 |
| WO | WO 2010/071134 | 6/2010 |

OTHER PUBLICATIONS

International Search Report dated Feb. 7, 2017 in PCT/JP2016/088514, filed on Dec. 22, 2016 (with English Translation).

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

Surface-modified metal oxide particles, includes: a metal oxide particle having a refractive index of at least 1.9 to light having a wavelength of 589 nm; a first surface-modifying group having a group represented by formula (A1); and a second surface-modifying group having a group represented by formula (A2). $R^1$ is a hydrogen atom or a $C_{1-4}$ hydrocarbon group; n is an integer of from 1 to 20, m is an integer of at least 3 and at most (2n+1); a is an integer of from 0 to 2; $R^3$ is a hydrogen atom or a methyl group; $R^4$ is a hydrogen atom or a $C_{1-4}$ hydrocarbon group; X is —O— or —NH—; b is an integer of from 2 to 10; and c is an integer of from 0 to 2.

$$C_nF_mH_{2n+1-m}-SiR^1_a(-*)_{3-a} \qquad (A1)$$

$$CH_2=CR^3C(O)-X-(CH_2)_b-SiR^4_c(-*)_{3-c} \qquad (A2)$$

13 Claims, No Drawings

SURFACE-MODIFIED METAL OXIDE PARTICLES, PRODUCTION METHOD, DISPERSION LIQUID, CURABLE COMPOSITION, AND CURED PRODUCT

TECHNICAL FIELD

The present invention relates to surface-modified metal oxide particles and a method for producing them, a dispersion liquid and curable composition containing the surface-modified metal oxide particles, and a cured product obtained by curing the curable composition.

BACKGROUND ART

A cured product obtained by curing a curable composition attracts attention as a material for an optical member which replaces glass by virtue of advantages such that (i) cured products in various shapes can be formed in a short time from the curable composition by imprint technology, cast molding, etc., (ii) it is less likely to be broken as compared with glass, and (iii) it is light in weight as compared with glass. Thermoplastic resins have also been used from the same reasons, however, low yield by the sprue and the runner in the injection molding process has been pointed out.

An optical member particularly a lens is required to reduce chromatic aberration in some cases. Accordingly, as a curable composition, one which has a high Abbe number and from which a highly transparent cured product can be obtained, is required in some cases.

As a curable composition for an optical member, Patent Document 1 proposes a photocurable composition comprising surface-modified metal oxide particles having metal oxide particles (such as titania particles or zirconia particles) having a high refractive index surface-treated with a surface-modifying agent obtained by reacting a first polymerizable component containing a fluorinated compound having a (meth)acryloyl group with a compound having a mercapto group and a carboxy group so that the mercapto group is added to the (meth)acryloyl group; a second polymerizable component containing a fluorinated compound having a (meth)acryloyl group; and a photopolymerization initiator.

PRIOR ART DOCUMENTS

Patent Documents

Patent Document 1: WO2010/071134

DISCLOSURE OF INVENTION

Technical Problem

However, on the surface of the surface-modified metal oxide particles in the curable composition proposed in Patent Document 1, the proportion of the surface-modifying groups derived from the first polymerizable component other than the fluorinated compound, and the linking groups derived from the compound having a mercapto group and a carboxy group is high, whereby it is difficult to increase the fluorine atom content in the surface-modifying groups.

Accordingly, the surface-modified metal oxide particles in the curable composition in Patent Document 1 have low compatibility with the fluorinated compound in the second polymerizable component. Accordingly, if the proportion of the fluorinated compound in the second polymerizable component in the curable composition in Patent Document 1 is increased or the fluorine atom content in said fluorinated compound is increased so as to increase the Abbe number of the obtainable cured product, the surface-modified metal oxide particles cannot be uniformly dispersed in the second polymerizable component, thus lowering the transparency of the obtainable cured product.

The present invention provides surface-modified metal oxide particles having fluoroalkyl group-containing surface-modifying groups and (meth)acryloyl group-containing surface-modifying groups on their surface, which are readily dispersed in a liquid fluorinated compound having a high fluorine atom content, and a method for producing them; a dispersion liquid having a high Abbe number and being excellent in transparency; a curable composition from which a cured product having a high Abbe number and being excellent in transparency can be obtained; and a cured product having a high Abbe number and being excellent in transparency.

Solution to Problem

The present invention provides the following constitutions.

<1> Surface-modified metal oxide particles, comprising metal oxide particles having a refractive index of at least 1.9 to light having a wavelength of 589 nm and on their surface, first surface-modifying groups having a group represented by the following formula (A1) and second surface-modifying groups having a group represented by the following formula (A2):

$$C_nF_mH_{2n+1-m}\text{—}SiR^1_a(\text{—}*)_{3-a} \quad (A1)$$

wherein * is the binding site of Si, $R^1$ is a hydrogen atom or a $C_{1-4}$ hydrocarbon group, n is an integer of from 1 to 20, m is an integer of at least 3 and at most (2n+1), and "a" is an integer of from 0 to 2, provided that when "a" is 2, two $R^1$s may be the same or different;

$$CH_2\text{=}CR^3C(O)\text{—}X\text{—}(CH_2)_b\text{—}SiR^4_c(\text{—}*)_{3-c} \quad (A2)$$

wherein * is the binding site of Si, $R^3$ is a hydrogen atom or a methyl group, $R^4$ is a hydrogen atom or a $C_{1-4}$ hydrocarbon group, X is —O— or —NH—, b is an integer of from 2 to 10, and c is an integer of from 0 to 2, provided that when c is 2, two $R^4$s may be the same or different.

<2> The surface-modified metal oxide particles according to <1>, wherein based on 100 mass % of the surface-modified metal oxide particles, the proportion of the metal oxide particles is from 20 to 84 mass %, and the proportion (content) of surface-modifying organic components (the total amount of the first surface-modifying groups and the second surface-modifying groups) is from 16 to 80 mass %.

<3> The surface-modified metal oxide particles according to <1> or <2>, wherein based on 100 mass % of the surface-modified metal oxide particles, the proportion of the first surface-modifying groups is from 15 to 55 mass %, and the proportion of the second surface-modifying groups is from 1 to 25 mass %.

<4> A method for producing surface-modified metal oxide particles, which comprises surface-treating the surface of metal oxide particles having a refractive index of at least 1.9 to light having a wavelength of 589 nm, with a compound represented by the following formula (A10) and a compound represented by the following formula (A20):

$$C_nF_mH_{2n+1-m}\text{—}SiR^1_a(OR^2)_{3-a} \quad (A10)$$

wherein R¹a, m and n are as defined for the formula (A1) in claim 1, and R² is a hydrogen atom or a $C_{1-10}$ hydrocarbon group, provided that when "a" is 0 or 1, three or two R²s may be the same or different;

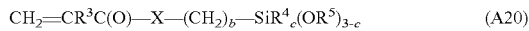

$$CH_2=CR^3C(O)-X-(CH_2)_b-SiR^4_c(OR^5)_{3-c} \quad (A20)$$

wherein R³, R⁴, b and c are as defined for the formula (A2) in claim 1, and R⁵ is a hydrogen atom or a $C_{1-10}$ hydrocarbon group, provided that when c is 0 or 1, three or two R⁵s may be the same or different.

<5> The method for producing surface-modified metal oxide particles according to <4>, wherein based on 100 mass % of the total amount of the compound represented by the formula (A10) and the compound represented by the formula (A20), the proportion of the compound represented by the formula (A10) is from 39 to 98 mass %, and the proportion of the compound represented by the formula (A20) is from 2 to 61 mass %.

<6> The method for producing surface-modified metal oxide particles according to <4> or <5>, wherein the total amount of the compound represented by the formula (A10) and the compound represented by the formula (A20) is from 65 to 1,360 parts by mass based on 100 parts by mass of the metal oxide particles.

<7> A dispersion liquid containing the surface-modified metal oxide particles as defined in any one of <1> to <3>, and a fluorinated compound which has a fluorine atom content of at least 20 mass % and which is liquid at 25° C., wherein based on 100 mass % of the total amount of the surface-modified metal oxide particles and the fluorinated compound, the proportion of the surface-modified metal oxide particles is from 1 to 90 mass % and the proportion of the fluorinated compound is from 10 to 99 mass %.

<8> The dispersion liquid according to <7>, which has an Abbe number of at least 58 as determined from the following formula (I) and has a transmittance of at least 40% to light having a wavelength of 600 nm:

$$v_D=(n_D-1)/(n_F-n_C) \quad (I)$$

wherein $v_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

<9> A curable composition containing the surface-modified metal oxide particles (A) as defined in any one of <1> to <3>, a compound (B) having a fluorine atom content of at least 20 mass % and having at least one (meth)acryloyl group (excluding the particles (A)), and a polymerization initiator (D), wherein based on 100 mass % of the total amount of the particles (A) and all compounds having a (meth)acryloyl group (excluding the particles (A)), the proportion of the particles (A) is from 1 to 90 mass %, and the proportion of the compound (B) is from 10 to 99 mass %, and wherein based on 100 parts by mass of the total amount of the particles (A) and all compounds having a (meth)acryloyl group (excluding the particles (A)), the amount of the polymerization initiator (D) is from 0.01 to 10 parts by mass.

<10> The curable composition according to <9>, which further contains a compound (C) having at least one (meth)acryloyl group (excluding the particles (A) and the compound (B)), and wherein based on 100 mass % of the total amount of all compounds having a (meth)acryloyl group (excluding the particles (A)), the proportion of the particles (A) is from 1 to 89 mass %, the proportion of the compound (B) is from 10 to 98 mass %, and the proportion of the compound (C) is from 1 to 50 mass %.

<11> The curable composition according to <9> or <10>, wherein the compound (B) is a fluoro(meth)acrylate.

<12> The curable composition according to any one of <9> to <11>, wherein the compound (C) is a compound (C1) having one (meth)acryloyloxy group or a compound (C2) having two or more (meth)acryloyloxy groups (the compounds (1) and (C2) exclude the same compounds as the particles (A) and the compound (B)).

<13> A cured product obtained by curing the curable composition as defined in any one of <9> to <12>.

Advantageous Effects of Invention

The surface-modified metal oxide particles of the present invention are readily dispersed in a liquid fluorinated compound having a high fluorine atom content. According to the method for producing surface-modified metal oxide particles of the present invention, surface-modified metal oxide particles which are readily dispersed in a liquid fluorinated compound having a high fluorine atom content can be produced. The dispersion liquid of the present invention has a high Abbe number and is excellent in transparency. According to the curable composition of the present invention, a cured product having a high Abbe number and being excellent in transparency can be obtained.

DESCRIPTION OF EMBODIMENTS

In this specification, the following terms have the following meanings.

"A compound represented by the formula (A10)" will sometimes be referred to as "a compound (A10)". Compounds represented by other formulae will be referred to in the same manner.

A "(meth)acryloyl group" means both an acryloyl group and a methacryloyl group.

A "(meth)acrylate" means both an acrylate and a methacrylate.

"(Meth)acrylic acid" means both acrylic acid and methacrylic acid.

"Light" collectively means ultraviolet rays, visible rays, infrared rays, electron rays and radioactive rays.

<Surface-Modified Metal Oxide Particles>

The surface-modified metal oxide particles of the present invention comprise metal oxide particles and on their surface, the after-mentioned first surface-modifying groups and the after-mentioned second surface-modifying groups. The surface-modified metal oxide particles of the present invention may be composed of a single species, or may be a mixture of two or more differing in the metal oxide particles or the surface-modifying groups.

The median diameter of the surface-modified metal oxide particles of the present invention is preferably from 1 to 1,000 nm, more preferably from 1 to 100 nm. When the median diameter is at least the above lower limit value, favorable handling efficiency will be achieved, and further, primary particles will hardly be agglomerated and are readily monodispersed. When the median diameter is at most the above upper limit value, the obtainable cured product will be more excellent in transparency.

(Metal Oxide Particles)

The refractive index of the metal oxide particles the surface of which is unmodified to light having a wavelength of 589 nm is at least 1.9, preferably fat least 2.0. When the refractive index is at least the lower limit value of the above range, the Abbe number of the dispersion liquid and the cured product is high, and the refractive index will not be greatly reduced. The above refractive index is preferably higher, however, the refractive index of existing oxide particles is usually at most 2.7.

The metal oxide particles may, for example, be zirconia particles, titania particles, zinc oxide particles, hafnium oxide, germanium oxide particles, niobium oxide particles, tantalum oxide particles, tungsten oxide particles, cerium oxide, indium oxide particles or tin oxide. Among them, preferred are zirconia particles or titania particles, which have a high refractive index and have a high compatibility with other materials.

The metal oxide particles may be solid particles, may be hollow particles, may be porous particles, or may be composite oxide particles.

The median diameter of the metal oxide particles the surface of which is unmodified is preferably from 1 to 1,000 nm, more preferably from 1 to 100 nm. When the median diameter is at least the above lower limit value, favorable handling efficiency will be achieved, and further, primary particles will hardly be agglomerated and are readily monodispersed. When the median diameter is at most the above upper limit value, the obtainable cured product will be more excellent in transparency.

(First Surface-Modifying Group)

The first surface-modifying group is a surface-modifying group having a group represented by the following formula (A1):

In the formula (A1), * is the binding site of Si. $R^1$ is a hydrogen atom or a $C_{1-4}$ hydrocarbon group. The hydrocarbon group is preferably an alkyl group, more preferably a linear alkyl group. The alkyl group is preferably a methyl group or an ethyl group in view of the handling efficiency of the after-described compound (A10), particularly preferably a methyl group in view of availability of the compound (A10).

n is an integer of from 1 to 20, preferably an integer of from 3 to 20 in view of compatibility with a fluorinated compound having a high fluorine atom content, particularly preferably from 3 to 10 in view of little influence over the environment and availability of the compound (A10).

m is an integer of at least 3 and at most (2n+1). When m is at least 3, high compatibility with a fluorinated compound having a high fluorine atom content will be achieved. When n is an integer of at least 3, m is preferably an integer of at most (2n−3) in view of availability of the compound (A10).

a is an integer of from 0 to 2, preferably an integer of from 0 to 1 in view of the reactivity with the compound (A10), particularly preferably 0. When a is 2, two $R^1$ s may be the same or different.

As the group represented by the formula (A1), the following groups may be mentioned.

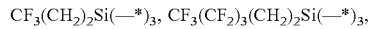

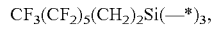

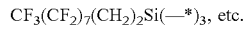

(Second Surface-Modifying Group)

The second surface-modifying group is a surface-modifying group having a group represented by the following formula (A2):

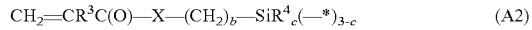

In the formula (A2), * is the binding site of Si. $R^3$ is a hydrogen atom or a methyl group.

$R^4$ is a hydrogen atom or a $C_{1-4}$ hydrocarbon group. The hydrocarbon group is preferably an alkyl group, more preferably a linear alkyl group. The alkyl group is preferably a methyl group or an ethyl group in view of handling efficiency of the after-described compound (A20), particularly preferably a methyl group in view of availability of the compound (A20).

X is —O— or —NH—, and is particularly preferably —O— in view of availability of the compound (A20).

b is an integer of from 2 to 10, preferably an integer of from 2 to 8, more preferably an integer of from 2 to 3, and is particularly preferably 3 in view of availability of the compound (A20). When the alkylene group in the second surface-modifying group is a short chain having at most 10 carbon atoms (preferably at most 8), a liquid fluorinated compound having a high fluorine atom content can get close to the first surface-modifying group. Accordingly, the surface-modified metal oxide particles will have a further higher compatibility with a liquid fluorinated compound having a high fluorine atom content (specifically at least 20 mass %) and will readily be dispersed in the fluorinated compound.

c is an integer of from 0 to 2, preferably an integer of from 0 to 1 in view of the reactivity of the compound (A20), particularly preferably 0. In a case where c is 2, two $R^4$ s may be the same or different.

As the group represented by the formula (A2), the following groups may be mentioned.

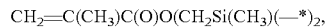

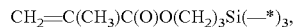

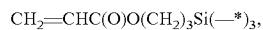

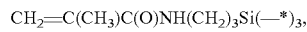

(Composition of Surface-Modified Metal Oxide Particles)

The proportion (content) of the metal oxide particles is preferably from 20 to 84 mass %, more preferably from 30 to 75 mass % based on 100 mass % of the surface-modified metal oxide particles. When the proportion is at least the lower limit value of the above range, the Abbe number tends to be high, and the refractive index will not significantly be decreased. When the proportion is at most the upper limit value of the above range, the surface-modified metal oxide particles will have favorable compatibility with the fluorinated compound.

The proportion of the surface-modifying organic components (the total amount of the first surface-modifying groups and the second surface-modifying groups) is preferably from 16 to 80 mass %, more preferably from 25 to 70 mass % based on 100 mass % of the surface-modified metal oxide particles. When the proportion is at least the lower limit value of the above range, the surface-modified metal oxide particles will have favorable compatibility with the fluorinated compound. When the proportion is at most the upper limit value of the above range, the Abbe number tends to be high, and the refractive index will not significantly be decreased.

The proportion of the first surface-modifying groups is preferably from 15 to 55 mass %, more preferably from 20 to 50 mass % based on 100 mass % of the surface-modified metal oxide particles. When the proportion is at least the lower limit value of the above range, the Abbe number of a cured product obtained by curing a curable composition containing the surface-modified metal oxide particles will be sufficiently high. When the proportion is at most the upper limit value of the above range, a curable composition containing the surface-modified metal oxide particles will be excellent in curing property.

The proportion of the second surface-modifying groups is preferably from 1 to 25 mass %, more preferably from 5 to 20 mass % based on 100 mass % of the surface-modified metal oxide particles. When the proportion is at least the lower limit value of the above range, a curable composition containing the surface-modified metal oxide particles will be excellent in curing property. When the proportion is at most the upper limit value of the above range, the surface-modified metal oxide particles will be excellent in compatibility with a liquid fluorinated compound having a high fluorine atom content.

The proportion of the metal oxide particles and the proportion (content) of the surface-modifying organic components can be obtained by measuring the thermogravimetric loss (that is, the amount of the surface-modifying organic components) of the surface-modified metal oxide particles using a thermogravimetric analyzer.

The proportion of the first surface-modifying groups and the proportion of the second surface-modifying groups can be calculated from the proportion of groups characteristic to each surface-modifying group obtained from e.g. an infrared spectrum and $^{19}$F-NMR spectrum of the surface-modified metal oxide particles.

From the above-described surface-modified metal oxide particles of the present invention, which comprise metal oxide particles having a refractive index of at least 1.9 and first surface-modifying groups having a fluoroalkyl group, a cured product having a high Abbe number can be obtained without significantly decreasing the refractive index.

Further, since the surface-modified metal oxide particles have the first surface-modifying groups, the fluorine atom content in the surface-modifying groups can be increased, whereby the surface-modified metal oxide particles will readily be dispersed in a liquid fluorinated compound having a high fluorine atom content.

Further, since the surface-modified metal oxide particles have the second surface-modifying groups, a cured product excellent in mechanical properties can be obtained by using the compound having a (meth)acryloyl group and a polymerizable initiator in combination.

<Method for Producing Surface-Modified Metal Oxide Particles>

The surface-modified metal oxide particles of the present invention may be obtained, for example, by surface-treating surfaces of the metal oxide particles with a compound (A10) and a compound (A20).

Specifically, the compound (A10) and the compound (A20) are added to a dispersion liquid containing the metal oxide particles and water, so that the compound (A10) and the compound (A20) are hydrolyzed in the presence of a catalyst, and their hydrolyzates are reacted with the hydroxy groups on the surface of the metal oxide particles.

Otherwise, surfaces of the metal oxide particles may be surface-treated with the compound (A10) and the compound (A20) to obtain primarily coated surface-modified metal oxide particles, and the surface is further surface-treated with the compound (A10) to obtain secondarily coated surface-modified metal oxide particles. The secondarily coated particles will be more excellent in compatibility with the fluorinated compound.

(Dispersion Liquid of Metal Oxide Particles)

As the dispersion liquid of the metal oxide particles, a metal oxide sol (e.g. a zirconia sol or a titania sol) may be used. The metal oxide particles may be used alone or in combination of two or more.

As the dispersion medium, water or a mixed solvent of water and a water-soluble organic solvent (such as an alcohol) may be used. The concentration of the metal oxide particles is preferably from 1 to 60 mass %, more preferably from 5 to 40 mass %, further preferably from 10 to 20 mass % based on 100 mass % of the dispersion liquid.

(Compound (A10))

The compound (A10) is a compound represented by the following formula:

$$C_nF_mH_{2n+1-m}\text{—}SiR^1{}_a(OR^2)_{3-a} \qquad (A10)$$

In the formula (A10), $R^1$ is a hydrogen atom or $C_{1-4}$ hydrocarbon group, $R^2$ is a hydrogen atom or a $C_{1-10}$ hydrocarbon group, n is an integer of from 1 to 20, m is an integer of at least 3 and at most (2n+1), and "a" is an integer of from 0 to 2, provided that when "a" is 2, two $R^1$ s may be the same or different, and when "a" is 0 or 1, three or two $R^2$s may be the same or different.

The hydrocarbon group is preferably an alkyl group, more preferably a linear alkyl group. The alkyl group is preferably a methyl group or an ethyl group in view of the handling efficiency and availability of the compound (A10). When "a" is 0 or 1, three or two $R^2$ s may be the same or different.

The compound (A10) may, for example, be trifluoropropyltrimethoxysilane, nonafluorohexyltrimethoxysilane, tridecafluorooctyltrimethoxysilane, heptadecafluorodecyltrimethoxysilane, trifluoropropyltriethoxysilane, nonafluorohexyltriethoxysilane, tridecafluorooctyltriethoxysilane or heptadecafluorodecyltriethoxysilane.

The compound (A10) may be used alone or in combination of two or more. When it is used in combination of two or more, the compatibility with the fluorinated compound will improve as compared with a case where it is used alone.

The proportion of the compound (A10) is preferably from 39 to 98 mass %, more preferably from 52 to 92 mass % based on 100 mass % of the total amount of the compound (A10) and the compound (A20). When the proportion is at least the lower limit value of the above range, the Abbe number of a cured product obtained by curing a curable composition containing the surface-modified metal oxide particles will be sufficiently high. When the proportion is at most the upper limit value of the above range, a curable composition containing the surface-modified metal oxide particles will be excellent in curing property.

In a case where the surface-modified metal oxide particles are secondarily coated particles, the proportion of the compound (A10) is the total proportion of the compound (A10) used for primary coating and secondary coating.

(Compound (A20))

The compound (A20) is a compound represented by the following formula:

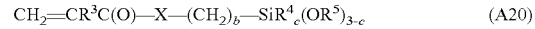

$$CH_2\!=\!CR^3C(O)\text{—}X\text{—}(CH_2)_b\text{—}SiR^4{}_c(OR^5)_{3-c} \qquad (A20)$$

In the formula (A20), $R^3$ is a hydrogen atom or a methyl group, $R^4$ is a hydrogen atom or a $C_{1-4}$ hydrocarbon group, $R^5$ is a hydrogen atom or a $C_{1-10}$ hydrocarbon group, X is —O— or —NH—, b is an integer of from 2 to 10, and c is an integer of from 0 to 2, provided that when c is 2, two $R^4$ s may be the same or different, and when c is 0 or 1, three or two $R^5$ s may be the same or different.

The hydrocarbon group is preferably an alkyl group, more preferably a linear alkyl group. The alkyl group is preferably a methyl group or an ethyl group in view of the handling efficiency and availability of the compound (A20). When c is 0 or 1, three or two $R^5$ s may be the same or different.

The compound (A20) may, for example, be 3-methacryloyloxypropylmethyldimethoxysilane, 3-methacryloyloxypropyltrimethoxysilane, 3-methacryloyloxypropylmethyldiethoxysilane, 3-methacryloyloxypropyltriethoxysilane, 3-acryloyloxypropyltrimethoxysilane, 3-(isopropenylcarbonylamino)propyltrimethoxysilane or 3-(vinylcarbonylamino)propyltrimethoxysilane. The compound (A20) may be used alone or in combination of two or more.

The proportion of the compound (A20) is preferably from 2 to 61 mass %, more preferably from 8 to 48 mass % based on 100 mass % of the total amount of the compound (A10) and the compound (A20). When the proportion is at least the lower limit value of the above range, a curable composition containing the surface-modified metal oxide particles will be excellent in curing property. When the proportion is at most the upper limit value of the above range, the surface-modified metal oxide particles will be excellent in compatibility with a liquid fluorinated compound having a high fluorine atom content.

The total amount of the compound (A10) and the compound (A20) is preferably from 65 to 1,360 parts by mass, more preferably from 113 to 793 parts by mass based on 100 parts by mass of the metal oxide particles. In a case where the surface-modified metal oxide particles are secondarily coated particles, the amount of the compound (A10) is the total amount of the compound (A10) used for primary coating and secondary coating.

(Catalyst)

The catalyst may, for example, be an acid catalyst, a basic catalyst or an ion exchange resin. The acid catalyst may, for example, be hydrochloric acid, nitric acid, acetic acid, sulfuric acid, phosphoric acid, sulfonic acid, methanesulfonic acid or p-toluenesulfonic acid. The basic catalyst may, for example, be sodium hydroxide, potassium hydroxide, ammonia or triethylamine.

The temperature at the time of the surface treatment is preferably from 50 to 200° C., more preferably from 80 to 150° C. When the dispersion medium is water, the surface treatment is conducted preferably under reflux. The surface treatment time may properly be determined depending upon the temperature, the concentration, etc. and is not particularly limited, and is preferably from 1 to 24 hours, more preferably from 3 to 12 hours.

<Dispersion Liquid of Surface-Modified Metal Oxide Particles>

The dispersion liquid of the present invention contains the surface-modified metal oxide particles of the present invention and a fluorinated compound which has a fluorine atom content (hereinafter sometimes referred to as F content) of at least 20 mass % and which is liquid at 25° C.

(Fluorinated Compound)

The fluorinated compound which is liquid at 25° C. functions as a dispersion medium in which the surface-modified metal oxide particles of the present invention are dispersed.

The F content of the fluorinated compound is at least 20 mass %, preferably from 25 to 80 mass %, more preferably from 30 to 70 mass %. When the F content of the fluorinated compound is at least the lower limit value of the above range, the Abbe number of the dispersion liquid of the present invention will be sufficiently high. When the F content of the fluorinated compound is at most the upper limit value of the above range, the surface-modified metal oxide particles of the present invention will be uniformly dispersed.

The fluorinated compound may, for example, be a fluorinated organic solvent or the after-described compound (B).

The fluorinated organic solvent may, for example, be a hydrofluoroalkane, a chlorofluorocarbon, a hydrochlorofluorocarbon, a hydrofluoromonoether, a perfluoromonoether, a perfluoroalkane, a perfluoropolyether, a perfluoroamine, a fluorine atom-containing alkene, a fluorine atom-containing aromatic solvent, a fluorine atom-containing ketone or a fluorine atom-containing ester. As commercial products, for example, ASAHIKLIN (registered trademark of Asahi Glass Company, Limited) AK-225 ($CF_3CF_2CHCl_2$), AC-2000 ($CF_3CF_2CF_2\ CF_2CF_2CHF_2$), AC-6000 ($CF_3CF_2\ CF_2\ CF_2CF_2\ CF_2\ CH_2\ CH_3$), AE-3000 ($CF_3\ CH_2\ OCF_2\ CHF_2$); Novec (trade name, manufactured by Sumitomo 3M Limited) 7100 ($C_4\ F_9\ OCH_3$), 7200 ($C_4\ F_9\ OC_2\ H_5$), 7300 ($C_2\ F_5\ CF(OCH_3)CF(CF_3)_2$), Vertrel (trade name, manufactured by Du Pont-Mitsui Fluorochemicals Company, Ltd.) XF ($CF_3CHFCHFC_2\ F_5$), MCA, XH; and ZEORORA (trade name, manufactured by Zeon Corporation) H (heptafluorocyclopentane) may, for example, be mentioned. These compounds have a F content of at least 20 mass %.

The dispersion liquid of the present invention may contain, as the case require, an organic solvent other than the fluorinated compound, and additives.

Other organic solvent is preferably one which is not highly polar. As other organic solvent, methyl ethyl ketone, methyl isobutyl ketone, toluene or hexane may, for example, be mentioned.

As the additives, a surfactant, an antioxidant, a thixotropic agent, an antifoaming agent, an antigelling agent and a resin may, for example, be mentioned.

As the surfactant, Surflon (registered trademark of AGC SEIMI CHEMICAL CO., LTD.) S-243, S-386, S-420, S-611, S-651, S-393, KH-20, etc.; Fluorad (trade name of SUMITOMO 3M Limited) FC-170, FC-430, etc.; MEGAFACE (trade name of DIC Corporation) F-552, F-553, F-554, F-556, etc. may, for example, be mentioned.

As the antioxidant, IRGANOX (trade name of BASF) 1076, 1135, 1035, 1098, 1010, 1520L, etc. may, for example, be mentioned. By addition of the antioxidant, the heat resistance will improve, and yellowing will hardly occur.

As the thixotropic agent, DISPARLON (trade name of Kusumoto Chemicals, Ltd.) 308, 301, 6500, 6700, etc. may, for example, be mentioned. By addition of the thixotropic agent, dripping of the curable composition when left at rest can be suppressed, or the dispersion liquid may be thickened.

As the antifoaming agent, fluorosilicones (such as trimethyl-terminated trifluoropropylmethylsiloxane) and silicone oils may, for example, be mentioned.

As the antigelling agent, hydroquinone, hydroquinone monomethyl ether, 4-tert-butyl catechol, 3,5-dibutyl-4-hydroxytoluene, IRGASTAB (trade name of BASF) UV10, UV22 etc. may, for example, be mentioned. By addition of the antigelling agent, it will be easy to control cured and uncured regions by the amount of light applied at the time of curing.

As the resin, a fluororesin may, for example, be mentioned. By addition of the resin, shrinkage on curing may be suppressed, thermal expansion may be suppressed or mechanical strength may be imparted.

(Proportion of Components in Dispersion Liquid)

The proportion (content) of the surface-modified metal oxide particles is from 1 to 90 mass %, preferably from 3 to 85 mass %, more preferably from 5 to 80 mass % based on 100 mass % of the total amount of the surface-modified metal oxide particles and the fluorinated compound. When the proportion is at least the lower limit value of the above range, the Abbe number of the dispersion liquid is high. When the proportion is at most the upper limit value of the above range, the surface-modified metal oxide particles will have favorable compatibility with other components and will readily be uniformly dispersed in the dispersion liquid, and the dispersion liquid will be excellent in transparency.

The proportion of the fluorinated compound is from 10 to 99 mass %, preferably from 15 to 97 mass %, more preferably from 20 to 95 mass % based on 100 mass % of the total amount of the surface-modified metal oxide particles and the fluorinated compound. When the proportion is at least the lower limit value of the above range, the Abbe number of the dispersion liquid is sufficiently high. When the proportion is at most the upper limit value of the above range, the fluorinated compound will have favorable compatibility with other components, and the dispersion liquid will be excellent in transparency.

The amount of addition of other organic solvent is preferably at most 5 parts by mass, more preferably at most 3 parts by mass based on 100 parts by mass of the total amount of the surface-modified metal oxide particles and the fluorinated compound. The total amount of addition of other components such as additives is preferably at most 5 parts by mass, more preferably at most 3 parts by mass based on 100 parts by mass of the total amount of the surface-modified metal oxide particles and the fluorinated compound.

The Abbe number of the dispersion liquid determined from the following formula (I) is preferably at least 58, more preferably at least 60. When the Abbe number is at least the lower limit value of the above range, chromatic aberration is less likely to occur. The Abbe number is preferably as high as possible and its upper limit is not particularly limited, and it is about 70 considering that the dispersion liquid is composed of organic matters.

$$\nu_D = (n_D - 1)/(n_F - n_C) \quad (I)$$

wherein $\nu_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

The refractive index of the dispersion liquid to light having a wavelength of 600 nm is preferably at least 40%, more preferably at least 45%. When the transmittance to light is at least the above lower limit value, the dispersion liquid will be more excellent in transparency.

The transmittance of the dispersion liquid to light having a wavelength of 600 nm is measured by the method disclosed in JIS K7361: 1997 (ISO 13468-1: 1996) with respect to the dispersion liquid in a quartz cell having an optical path length of 10 mm using light having a wavelength of 600 nm at 25° C.

(Method for Producing Dispersion Liquid)

The dispersion liquid of the present invention is obtained by mixing the surface-modified metal oxide particles of the present invention and the fluorinated compound. The surface-modified metal oxide particles may be in a powder state, or in a state of a dispersion liquid in an organic solvent other than the fluorinated compound.

The above-described dispersion liquid of the present invention, which contains the surface-modified metal oxide particles having first surface-modifying groups on their surface and the fluorinated compound having a F content of at least 20 mass %, has a high Abbe number. Further, it is excellent in the transparency since it contains the surface-modified metal oxide particles which have favorable compatibility with the liquid fluorinated compound having a high F content and which are readily dispersed in the fluorinated compound.

<Curable Composition>

The curable composition of the present invention contains, as essential components, the surface-modified metal oxide particles of the present invention (hereinafter sometimes referred to as surface-modified metal oxide particles (A)), a compound (B) and a polymerization initiator (D).

The viscosity of the curable composition of the present invention at 25° C. is preferably from 10 to 15,000 mPa·s, more preferably from 100 to 12,000 mPa·s. When the viscosity is within the above range, the curable composition can readily be brought into contact with a mold for imprint or can readily be poured into a mold for cast molding without any special operation (for example, an operation of heating the curable composition to high temperature to lower its viscosity). Further, the curable composition can easily be applied to the surface of a substrate without flowing out of the surface of the substrate.

(Compound (B))

The compound (B) has a F content of at least 20 mass % and has at least one (meth)acryloyl group.

The F content of the compound (B) is at least 20 mass %, preferably from 25 to 60 mass %, more preferably from 30 to 70 mass %. When the F content is at least the lower limit value of the above range, the Abbe number of the curable product is sufficiently high. When the F content is at most the upper limit value of the above range, the compound (B) will have favorable compatibility with other components. The compound (B) includes a compound (B1) in which the group other than the (meth)acryloyloxy group is a linear fluoroalkyl group or fluoroalkylene group and a compound (B2) in which the group other than the (meth)acryloyloxy group has a branched structure, —O—, —NH— or the like.

The compound (B) is preferably a fluoro(meth)acrylate in view of compatibility with other components.

As the fluoro(meth)acrylate, the following compounds may be mentioned. All of the following compounds have a F content of at least 20 mass %.

Compound (B1):

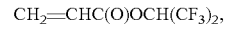
$CH_2=CHC(O)OCH(CF_3)_2$,

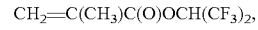
$CH_2=C(CH_3)C(O)OCH(CF_3)_2$,

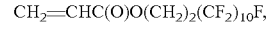
$CH_2=CHC(O)O(CH_2)_2(CF_2)_{10}F$,

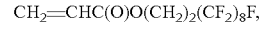
$CH_2=CHC(O)O(CH_2)_2(CF_2)_8F$,

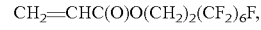
$CH_2=CHC(O)O(CH_2)_2(CF_2)_6F$,

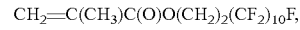
$CH_2=C(CH_3)C(O)O(CH_2)_2(CF_2)_{10}F$,

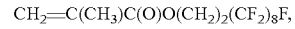
$CH_2=C(CH_3)C(O)O(CH_2)_2(CF_2)_8F$,

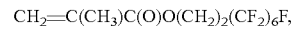
$CH_2=C(CH_3)C(O)O(CH_2)_2(CF_2)_6F$,

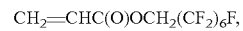
$CH_2=CHC(O)OCH_2(CF_2)_6F$,

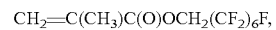
$CH_2=C(CH_3)C(O)OCH_2(CF_2)_6F$, $CH_2=CHC(O)OCH_2(CF_2)_7F$,

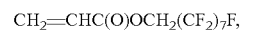
$CH_2=C(CH_3)C(O)OCH_2(CF_2)_7F$, $CH_2=CHC(O)OCH_2CF_2CF_2H$,

$CH_2=CHC(O)OCH_2(CF_2CF_2)_2H$, $CH_2=CHC(O)OCH_2(CF_2CF_2)_4H$, $CH_2=CHC(O)OCH_2(CF_2)_4CH_2OC(O)CH=CH_2$, $CH_2=C(CH_3)C(O)OCH_2(CF_2)_4CH_2OC(O)C(CH_3)=CH_2$, etc.

Compound (B2):

$CH_2=CHC(O)OCH_2CH(OH)CH_2CF_2CF_2CF(CF_3)_2$, $CH_2=C(CH_3)C(O)OCH_2CH(OH)CH_2CF_2CF_2CF(CF_3)_2$, $CH_2=C(CH_3)C(O)OCH_2CF_2CF_2H$, $CH_2=C(CH_3)C(O)OCH_2(CF_2CF_2)_2H$, $CH_2=C(CH_3)C(O)OCH_2(CF_2CF_2)_4H$, $CH_2=CHC(O)OCH_2CF_2OCF_2CF_2OCF_3$, $CH_2=CHC(O)OCH_2CF_2O(CF_2CF_2O)_3CF_3$, $CH_2=C(CH_3)C(O)OCH_2CF_2OCF_2CF_{20}CF_3$, $CH_2=C(CH_3)C(O)OCH_2CF_2O(CF_2CF_2O)_3CF_3$, $CH_2=CHC(O)OCH_2CF(CF_3)OCF_2CF(CF_3)O(CF_2)_3F$, $CH_2=CHC(O)OCH_2CF(CF_3)O(CF_2CF(CF_3)O)_2(CF_2)_3F$, $CH_2=C(CH_3)C(O)OCH_2CF(CF_3)OCF_2CF(CF_3)O(CF_2)_3F$, $CH_2=C(CH_3)C(O)OCH_2CF(CF_3)O(CF_2CF(CF_3)O)_2(CF_2)_3F$, $CH_2=CFC(O)OCH_2CH(OH)CH_2(CF_2CF(CF_3)_2$, $CH_2=CFC(O)OCH_2CH(CH_2OH)CH_2(CF_2)_6CF(CF_3)_2$, $CH_2=CFC(O)OCH_2CH(OH)CH_2(CF_2)_{10}F$, $CH_2=CFC(O)OCH_2CH(CH_2OH)CH_2(CF_2)_{10}F$, $CH_2=CHC(O)OCH_2CF_2(OCF_2CF_2)_pOCF_2CH_2OC(O)CH=CH_2$ (wherein p is an integer of from 1 to 20), $CH_2=C(CH_3)C(O)OCH_2CF_2(OCF_2CF_2)_3OCF_2CH_2OC(O)C(CH_3)=CH_2$ (wherein p is an integer of from 1 to 20), $CH_2=CHC(O)O(CH_2)_2NHC(O)OCH_2(CF_2)_3OCFHCF_2O(CH_2)_2OCF_2CFHO(CF_2)_3CH_2OC(O)NH(CH_2)_2OC(O)CH=CH_2$, etc.

The compound (B) may be used alone or in combination of two or more.

(Compound (C))

The compound (C) has at least one (meth)acryloyl group (excluding the same compound as the surface-modified metal oxide particles (A) and the compound (B)).

The compound (C) is preferably one having a (meth)acryloyl group and a $C_{1-30}$ organic group bonded to the (meth)acryloyl group via an oxygen atom. The organic group has preferably from 4 to 20, more preferably from 4 to 12 carbon atoms. The organic group may, for example, be a linear alkyl group, a branched alkyl group, a cycloalkyl group, an allyl group, a bridged hydrocarbon group, a group having a repeating structure of oxyalkylene chains, an aromatic group or a heterocyclic group. Such a group may have one or more carbon atoms substituted by a hetero atom such as a nitrogen atom or an oxygen atom or by a silicon atom, may have one or more hydrogen atoms substituted by a functional group such as a hydroxy group or an amino group, or may have an unsaturated bond or a free carboxy group. The organic group is preferably a linear alkyl group, a branched alkyl group, a cycloalkyl group or a bridged hydrocarbon group.

The compound (C) may be a compound (C1) having one (meth)acryloyloxy group or a compound (C2) having two or more (meth)acryloyloxy groups. The compound (C) may be used alone or in combination of two or more.

The compound (C1) is preferably an acrylic acid ester or a methacrylic acid ester. As the compound (C1), known compounds may be mentioned.

The compound (C2) is preferably a (meth)acrylate of a diol (such as glycol), a (meth)acrylate of a triol (such as glycerol or trimethylol), a (meth)acrylate of a tetraol (such as pentaerythritol), a urethane (meth)acrylate or an epoxy (meth)acrylate. As the compound (C2), known compounds may be mentioned.

(Polymerizable Initiator (D))

The polymerization initiator (D) is suitably selected depending upon the curing method (either photo-curing or heat curing), etc.

The polymerization initiator (D) may be a photopolymerization initiator or a thermal polymerizable initiator. The polymerization initiator (D) is preferably a photopolymerization initiator in view of easiness of production of a cured product.

The photopolymerization initiator may, for example, be a photoradical polymerizable initiator which generates radicals upon absorption of light. The photopolymerization initiator is preferably a photoradical polymerizable initiator in view of easiness of production of a cured product.

The photoradical polymerizable initiator may, for example, be an alkylphenone photopolymerization initiator, an acylphosphine oxide photopolymerization initiator, a titanocene photopolymerization initiator, an oxime ester photopolymerization initiator, an oxyphenyl acetate photopolymerization initiator, a benzoin photopolymerization initiator, a benzophenone photopolymerization initiator, a thioxanthone photopolymerization initiator, benzyl-(o-ethoxycarbonyl)-α-monoxime, glyoxy ester, 3-ketocoumarin, 2-ethylanthraquinone, cam phorquinone, tetramethylthiuram sulfide, azobisisobutyronitrile, benzoyl peroxide, dialkylperoxide or tert-butyl peroxypivarate. In view of sensitivity and compatibility, preferred is an alkylphenone photopolymerization initiator, an acylphosphine oxide photopolymerization initiator, a benzoin photopolymerization initiator or a benzophenone photopolymerization initiator. The photopolymerization initiator may be used alone or in combination of two or more.

The thermal polymerizable initiator may, for example, be 2,2'-azobisisobutyronitrile, benzoyl peroxide, tert-butyl hydroperoxide, cumen hydroperoxide, di-tert-butyl peroxide or dicumyl peroxide. 2,2'-azobisisobutyronitrile or benzoyl peroxide is preferred in view of the decomposition temperature. The thermal polymerizable initiator may be used alone or in combination of two or more.

The photocurable composition of the present invention may contain, as the case requires, the compound (C), additives, a solvent, etc.

As the additives, a surfactant, an antioxidant (heat resistant stabilizer), a thixotropic agent, an antifoaming agent, a light stabilizer, an antigelling agent, a photosensitizer, a resin, a resin oligomer, a carbon compound, metal fine particles, metal oxide particles (excluding the same particles as the surface-modified metal oxide particles (A)), a silane coupling agent and other organic compound may, for example, be mentioned.

As the solvent, any solvent in which the compound (B), the compound (C) and the polymerization initiator (D) are soluble may be used, and preferred is a solvent having at least one of an ester structure, a ketone structure, a hydroxy group and an ether structure. The content of the solvent in the curable composition may be properly adjusted depending upon the desired viscosity, application property, the desired film thickness, etc. In a case where a solvent is used, the solvent is preferably removed before the curable composition is cured.

(Proportion of Components in Curable Composition)

The proportion of the surface-modified metal oxide particles (A) is from 1 to 90 mass %, preferably from 3 to 85 mass %, more preferably from 5 to 80 mass % based on 100 mass % of the total amount of the surface-modified metal oxide particles (A) and all compounds having a (meth)acryloyl group (excluding the particles (A)). When the proportion is at least the lower limit value of the above range, the Abbe number of the obtainable cured product is high. When the proportion is at most the upper limit value of the above range, the surface-modified metal oxide particles (A) will have favorable compatibility with other components, they will readily be uniformly dispersed in the curable composition, and the obtainable cured product will be excellent in transparency.

The proportion of the compound (B) is from 10 to 99 mass %, preferably from 15 to 97 mass %, more preferably from 20 to 95 mass % based on 100 mass % of the total amount of the surface-modified metal oxide particles (A) and all compounds having a (meth)acryloyl group (excluding the particles (A)). When the proportion is at least the lower limit value of the above range, the compound (B) will have favorable compatibility with other components, and the obtainable cured product will be excellent in transparency. When the proportion is at most the upper limit value of the above range, the Abbe number of the cured product will be sufficiently high.

The proportion of the compound (B1) is preferably from 40 to 99 mass %, more preferably from 60 to 94 mass %, further preferably from 80 to 89 mass % based on 100 mass % of the total amount of the surface-modified metal oxide particles (A) and all compounds having a (meth)acryloyl group (excluding the particles (A)). When the proportion is at least the lower limit value of the above range, the compound (B1) will have favorable compatibility with other components, and the obtainable cured product will be excellent in transparency. When the proportion is at most the upper limit value of the above range, the Abbe number of the cured product will be sufficiently high.

The proportion of the compound (B2) is preferably from 10 to 99 mass %, more preferably from 15 to 97 mass %, further preferably from 20 to 95 mass % based on 100 mass % of the total amount of the surface-modified metal oxide particles (A) and all compounds having a (meth)acryloyl group (excluding the particles (A)). When the proportion is at least the lower limit value of the above range, the compound (B2) will have favorable compatibility with other components, and the obtainable cured product will be excellent in transparency. When the proportion is at most the upper limit value of the above range, the Abbe number of the cured product will be sufficiently high.

In a case where the curable composition of the present invention contains the compound (B1), the proportion of the surface-modified metal oxide particles (A) is preferably from 1 to 60 mass %, more preferably from 6 to 40 mass %, further preferably from 11 to 20 mass %.

In a case where the curable composition of the present invention contains the compound (C), the proportion of the compound (C) is from 1 to 50 mass %, preferably from 3 to 45 mass %, more preferably from 5 to 40 mass % based on 100 mass % of the total amount of the surface-modified metal oxide particles (A) and all compounds having a (meth)acryloyl group (excluding the particles (A)). When the proportion is at least the lower limit value of the above range, the compatibility of the respective components will be high, and the obtainable cured product will be excellent in transparency. When the proportion is at most the upper limit value of the above range, the Abbe number of the cured product will be high.

In a case where the curable composition of the present invention contains the compound (C), the proportion of the surface-modified metal oxide particles (A) is from 1 to 89 mass %, preferably from 3 to 82 mass %, more preferably from 5 to 75 mass %.

In a case where the curable composition of the present invention contains the compound (C), the proportion of the compound (B) is from 10 to 98 mass %, preferably from 15 to 94 mass %, more preferably from 20 to 90 mass %. The proportion of the compound (B1) is preferably from 40 to 98 mass %, more preferably from 60 to 91 mass %, further preferably from 80 to 84 mass %. The proportion of the compound (B2) is preferably from 10 to 98 mass %, more preferably from 15 to 94 mass %, further preferably from 20 to 90 mass %.

The amount of addition of the polymerization initiator (D) is from 0.01 to 10 parts by mass, preferably from 0.1 to 7 parts by mass, more preferably from 0.3 to 5 parts by mass based on 100 parts by mass of the total amount of the surface-modified metal oxide particles (A) and all compounds having a (meth)acryloyl group (excluding the particles (A)). When the addition amount is at least the lower limit value of the above range, a cured product will readily be formed. When the addition amount is at most the upper limit value of the above range, the respective components can be mixed uniformly, whereby the amount of the polymerization initiator (D) remaining in the cured product tends to be small, and a decrease of physical properties of the cured product can be suppressed.

The total amount of addition of other components such as additives may be within a range not to impair the effects of the present invention, and is preferably at most 5 parts by mass, more preferably at most 3 parts by mass based on 100 parts by mass of the total amount of the surface-modified metal oxide particles (A) and all compounds having a (meth)acryloyl group (excluding the particles (A)).

<Cured Product>

The cured product of the present invention is one obtained by curing the curable composition of the present invention. The cured product of the present invention may be formed on the surface of a substrate to obtain a laminate comprising a layer composed of the cured product and a layer composed of the substrate.

The Abbe number of the cured product determined by the above formula (I) is preferably at least 58, more preferably at least 60. When it is at least the lower limit value of the above range, chromatic aberration is less likely to occur. The Abbe number is preferably as high as possible and its upper limit is not particularly limited, and it is about 70 considering that the cured product is composed of organic matters.

The transmittance of the cured product to light having a wavelength of 600 nm is preferably at least 60%, more preferably at least 65%. When the transmittance to light is at least the above lower limit value, the cured product will be more excellent in transparency.

The transmittance of the cured product to light having a wavelength of 600 nm is measured by the method disclosed in JIS K7361: 1997(ISO 13468-1: 1996) with respect to a cured product having a thickness of from 10 to 200 μm using light having a wavelength of 600 nm at 25° C.

(Method for Producing Cured Product)

As a method for curing the cured product of the present invention, a method of curing the curable composition in a state where a mold having a pattern reverse to a fine pattern on its surface and the curable composition are in contact with each other, to form a cured product having the fine pattern on its surface (imprint technology); or a method of injecting the curable composition into the cavity of a mold and curing the curable composition to form a cured product (cast molding), may, for example, be mentioned.

As the curing method, photo-curing or heat curing may be mentioned and is properly selected depending upon the polymerization initiator (D). As the curing method, photo-curing is preferred in view of easiness of production of a cured product.

EXAMPLES

Now, the present invention will be described in further detail with reference to Examples. However, it should be understood that the present invention is not limited thereto.

Ex. 5 to 8, 11, 17, 18, 25 to 28 and 33 are Examples of the present invention, and Ex. 1 to 4, 9, 10, 12, 13 to 16, 19 to 24, 29 to 32 and 34 to 38 are Comparative Examples.

(Median Diameter)

The median diameters of the surface-modified metal oxide particles and the metal oxide particles the surface of which are unmodified were obtained by a particle size distribution measuring apparatus (manufactured by Otsuka Electronics Co, Ltd., FPAR1000) by dynamic light scattering method.

(Thermogravimetric Loss)

The surface-modified metal oxide particles were heated from 18° C. to 550° C. at a rate of 25° C./min. in a nitrogen atmosphere using a thermogravimetric analyzer (manufactured by TA Instruments, TGA-Q500) to measure the thermogravimetric loss.

(Infrared Spectrum)

With respect to the surface-modified metal oxide particles, an infrared spectrum was measured by using Fourier transform infrared spectrophotometer (manufactured by Thermo Fisher Scientific Inc., NICOLET iN10+iZ10).

(Solid-State $^{19}$F-NMR)

With respect to the surface-modified metal oxide particles, a solid-state $^{19}$F-NMR spectrum was measured by using a nuclear magnetic resonance spectrum measuring apparatus (manufactured by Bruker Biospin, AVANCE-III HD).

(Viscosity of Curable Composition)

The viscosity of the curable composition was obtained by measuring the dynamic viscoelasticity at a shear rate of $10s^{-1}$ at 25° C. by using a dynamic viscoelasticity measuring apparatus (manufactured by Anton Paar, Physica MCR501).

(Refractive Index of Dispersion Liquid and Curable Composition)

The refractive indices of the dispersion liquid and the curable composition were measured by using an Abbe refractometer (manufactured by ATAGO CO., LTD., multi-wavelength Abbe refractometer DR-M2) at a temperature of 25° C. at a wavelength of 589 nm.

(Abbe Number of Dispersion Liquid and Curable Composition)

The Abbe numbers of the dispersion liquid and the curable composition were calculated in accordance with the following formula (I) from refractive indices measured by using the same Abbe refractometer as above at a temperature of 25° C. at wavelengths of 589 nm, 486 nm and 656 nm:

$$v_D=(n_D-1)/(n_F-n_C) \quad (I)$$

(Refractive Index of Cured Product)

The curable composition was applied to the surface of a silicon wafer and irradiated with ultraviolet rays with an exposure of 3,000 mJ/cm$^2$ from a high pressure mercury lamp to form a film-form cured product. The refractive indices of the cured product to lights having wavelengths of 473 nm, 594 nm and 658 nm were measured by using a refractive index measuring apparatus (manufactured by Metricon Corporation, USA, Prism Coupler 2010/M), and the refractive index to light having a wavelength of 589 nm was calculated by means of Metricon Fit attached to the apparatus.

(Abbe Number of Cured Product)

The refractive indices to lights having the respective wavelengths were calculated by means of Metricon Fit attached to the above refractive index measuring apparatus, and the Abbe number was calculated in accordance with the formula (I).

(Cured Product for Evaluation)

The curable composition was applied to the surface of a glass substrate and irradiated with ultraviolet rays with an exposure of 3,000 mJ/cm$^2$ from a high pressure mercury lamp to form a film-form cured product. The cured product was separated from the glass substrate to obtain a cured product for evaluation.

(Transmittance of Dispersion Liquid and Cured Product)

The transmittances of the dispersion liquid and the cured product for evaluative to light having a wavelength of 600 nm were measured by an ultraviolet/visible/near infrared spectrophotometer (manufactured by Shimadzu Corporation, Solid Spec-3700).

(Metal Oxide Particles)

Aqueous dispersion of metal oxide particles (Z): a zirconia sol (manufactured by SAKAI CHEMICAL INDUSTRY CO., LTD., SZR—W, ZrO$_2$ concentration: 30 mass %, median diameter: 4.4 nm (dynamic light scattering method), pH: 4.3, refractive index of zirconia particles to light having a wavelength of 589 nm: 2.075 (extrapolated from the refractive index of 30 mass % aqueous dispersion)).

Aqueous dispersion of metal oxide particles (T): rutile titania sol (manufactured by SAKAI CHEMICAL INDUSTRY CO., LTD., SRD-W, TiO$_2$ concentration: 15 mass %, median diameter: 4.2 nm (dynamic light scattering method), pH: 2.2, refractive index of titania particles to light having a wavelength of 589 nm: 2.323 (extrapolated from the refractive index of 15 mass % aqueous dispersion)).

(Compound (A10))

Compound (A10-1): trifluoropropyltrimethoxysilane (manufactured by Shin-Etsu Chemical Co., Ltd., KBM-7103).

Compound (A10-2): trimethoxy(1H,1H,2H,2H-heptadecafluorodecyl)silane (manufactured by Tokyo Chemical Industry Co., Ltd.).

(Compound (A20))
Compound (A20-1): 3-methacryloyloxypropyltrimethoxysilane (manufactured by Shin-Etsu Chemical Co., Ltd., KBM-503).
Compound (A20-2): 8-methacryloyloxyoctyltrimethoxysilane (manufactured by Shin-Etsu Chemical Co., Ltd., KBM-5803).
(Fluorinated Organic Solvent)
HCFC-225: dichloropentafluoropropane (manufactured by Asahi Glass Company, Limited, ASAHIKLIN (registered trademark) AK-225, F content: 47 mass %).
(Compound (B))
Compound (B-1): $CH_2=C(CH_3)C(O)O(CH_2)_2 (CF_2)_6 F$ (manufactured by Asahi Glass Company, Limited, F content: 57 mass %).
Compound (B-2): $CH_2=CHC(O)OCH_2 CF_2 (OCF_2 CF_2)_2 OCF_2 CH_2 OC(O) CH=CH_2$ (manufactured by Shin-Nakamura Chemical Co., Ltd., NK ester DA-F4EO, F content: 44 mass %).
(Polymerizable Initiator (D))
Polymerizable initiator (D-1): photoradical polymerization initiator (trade name manufactured by BASF Japan, Irgacure 184).

Ex. 1

33 g of the aqueous dispersion of metal oxide particles (Z) was put in a 500 mL beaker, and 167 g of ethanol was added. 12.3 g of compound (A10-1) and 3.6 g of compound (A10-2) were added with stirring by a magnetic stirrer, and stirring was continued at room temperature for 7 days. An azeotropic mixture of ethanol and water was removed by an evaporator, and the mixture was concentrated until the liquid amount became 50 mL to obtain a concentrate. 250 mL of water was put in a 500 mL beaker, and the concentrate was added thereto over a period of 5 minutes with stirring by a magnetic stirrer, whereupon the mixture was clouded. Stirring was continued at room temperature for one day, and the precipitate was recovered by a filter and washed with 500 mL of water to obtain 25 g of a white solid containing water.

The obtained white solid was put in a 500 mL eggplant flask, a stirrer chip and 300 g of methyl isobutyl ketone (MIBK) were added, and a Dean-Stark dehydrator was attached, followed by heating in an oil bath to 130° C. with stirring. The transparency of the liquid in the flask increased as water was removed, and 3 hours later, at a point where water was no more removed, 1 g of triethylamine (manufactured by Tokyo Chemical Industry Co., Ltd.) was added, whereupon a highly transparent dispersion liquid was obtained two minutes later. After cooling, volatile content was distilled off from the dispersion liquid to evaporate it to dryness by an evaporator, followed by drying in a vacuum dryer at 70° C. for 15 hours to obtain 15 g of a powder of surface-modified oxide fine particles (AZ'-1).

The proportion of the surface-modifying organic components was obtained from the thermogravimetric loss of the surface-modified metal oxide particles (AZ'-1). The proportions of the two types of the first surface-modifying groups were obtained from the intensity ratios of the peak of the —$CF_3$ group derived from the compound (A10-1) and the peak of the —$C_8F_{17}$ group derived from the compound (A10-2) in the solid-state $^{19}$F-NMR spectrum of the surface-modified metal oxide particles (AZ'-1). The composition of the surface-modified metal oxide particles (AZ'-1) is shown in Table 1.

Ex. 2

17 g of surface-modified metal oxide particles (AZ'-2) were obtained in the same manner as in Ex. 1 except that the amount of compound (A10-1) charged was 6.9 g, and the amount of compound (A10-2) charged was 17.8 g.

The proportions of the two types of the first surface-modifying groups were obtained in the same manner as in Ex. 1. The composition of the surface-modified metal oxide particles (AZ'-2) is shown in Table 1.

Ex. 3

22 g of surface-modified metal oxide particles (AZ'-3) were obtained in the same manner as in Ex. 1 except that the amount of compound (A10-1) charged was 20.7 g, and the amount of compound (A10-2) charged was 5.4 g.

The proportions of the two types of the first surface-modifying groups were obtained in the same manner as in Ex. 1. The composition of the surface-modified metal oxide particles (AZ'-3) is shown in Table 1.

Ex. 4

20 g of surface-modified metal oxide particles (AZ'-4) were obtained in the same manner as in Ex. 1 except that the amount of compound (A10-1) charged was 7.8 g, and the amount of compound (A10-2) charged was 16.1 g.

The proportions of the two types of the first surface-modifying groups were obtained in the same manner as in Ex. 1. The composition of the surface-modified metal oxide particles (AZ'-4) is shown in Table 1.

Ex. 5

18 g of surface-modified metal oxide particles (AZ-5) were obtained in the same manner as in Ex. 1 except that compound (A10-2) was not added, the amount of compound (A10-1) charged was 12.3 g, and 1.6 g of compound (A20-1) was further added.

The proportion of the surface-modifying organic components was obtained from the thermogravimetric loss of the surface-modified metal oxide particles (AZ-5). The proportion of the first surface-modifying groups and the proportion of the second surface-modifying groups were obtained from the intensity ratios of the peak derived from the —$CF_3$ group in the vicinity of 1,260 cm$^{-1}$ derived from compound (A10-1) and the peak derived from C=O in the vicinity of 1,750 cm$^{-1}$ derived from compound (A20-1) in the infrared spectrum of the surface-modified metal oxide particles (AZ-5). The composition of the surface-modified metal oxide particles (AZ-5) is shown in Table 1.

Ex. 6

18 g of surface-modified metal oxide particles (AZ-6) were obtained in the same manner as in Ex. 1 except that compound (A10-2) was not added, the amount of compound (A10-1) charged was 12.5 g, and 2.0 g of compound (A20-2) was further added.

The proportion of the first surface-modifying groups and the proportion of the second surface-modifying groups were obtained in the same manner as in Ex. 5. The composition of the surface-modified metal oxide particles (AZ-6) is shown in Table 1.

Ex. 7

18 g of surface-modified metal oxide particles (AZ-7) were obtained in the same manner as in Ex. 1 except that the amount of compound (A10-1) charged was 11.3 g, the amount of compound (A10-2) charged was 4.8 g, and 0.7 g of compound (A20-1) was further added.

The proportions of the two types of the first surface-modifying groups and the proportion of the second surface-modifying groups were obtained in the same manner as in Ex. 5. The composition of the surface-modified metal oxide particles (AZ-7) is shown in Table 1.

Ex. 8

19 g of surface-modified metal oxide particles (AZ-8) were obtained in the same manner as in Ex. 1 except that the amount of compound (A10-1) charged was 7.7 g, the amount of compound (A10-2) charged was 14.1 g, and 0.6 g of compound (A20-1) was further added.

The proportions of the two types of the first surface-modifying groups and the proportion of the second surface-modifying groups were obtained in the same manner as in Ex. 5. The composition of the surface-modified metal oxide particles (AZ-8) is shown in Table 2.

Ex. 9

17 g of surface-modified metal oxide particles (AT'-1) were obtained in the same manner as in Ex. 1 except that 66 g of the aqueous dispersion of metal oxide particles (T) was used instead of the aqueous dispersion of metal oxide particles (Z), and the amount of ethanol was 234 g.

The proportions of the two types of the first surface-modifying groups were obtained in the same manner as in Ex. 1. The composition of the surface-modified metal oxide particles (AT'-1) is shown in Table 2.

Ex. 10

18 g of surface-modified metal oxide particles (AT'-2) were obtained in the same manner as in Ex. 2 except that 66 g of the aqueous dispersion of metal oxide particles (T) was used instead of the aqueous dispersion of metal oxide particles (Z), and the amount of ethanol was 234 g.

The proportions of the two types of the first surface-modifying groups were obtained in the same manner as in Ex. 1. The composition of the surface-modified metal oxide particles (AT'-2) is shown in Table 2.

Ex. 11

20 g of surface-modified metal oxide particles (AT'-3) were obtained in the same manner as in Ex. 7 except that 66 g of the aqueous dispersion of metal oxide particles (T) was used instead of the aqueous dispersion of metal oxide particles (Z), and the amount of ethanol was 234 g.

The proportions of the two types of the first surface-modifying groups and the proportion of the second surface-modifying groups were obtained in the same manner as in Ex. 5. The composition of the surface-modified metal oxide particles (AT'-3) is shown in Table 2.

Ex. 12

20 g of surface-modified metal oxide particles (AT'-4) were obtained in the same manner as in Ex. 8 except that 66 g of the aqueous dispersion of metal oxide particles (T) was used instead of the aqueous dispersion of metal oxide particles (Z), and the amount of ethanol was 234 g.

The proportion of the second surface-modifying groups was obtained in the same manner as in Ex. 5. The composition of the surface-modified metal oxide particles (AT-4) is shown in Table 2.

Ex. 13

19 g of surface-modified metal oxide particles (AZ'-13) were obtained in the same manner as in Ex. 1 except that compound (A10-1) and compound (A10-2) were not added, and 15.6 g of compound (A20-1) was added.

The proportion of the surface-modifying organic components was obtained from the thermogravimetric loss of the surface-modified metal oxide particles (AZ'-13). The composition of the surface-modified metal oxide particles (AZ'-13) is shown in Table 2.

Ex. 14

17 g of surface-modified metal oxide particles (AT'-5) were obtained in the same manner as in Ex. 1 except that compound (A10-1) and compound (A10-2) were not added, 66 g of the aqueous dispersion of metal oxide particles (T) was used instead of the aqueous dispersion of metal oxide particles (Z), 15.1 g of compound (A20-1) was added, and the amount of ethanol was 234 g.

The proportion of the surface-modifying organic components was obtained from the thermogravimetric loss of the surface-modified metal oxide particles (AT'-5). The composition of the surface-modified metal oxide particles (AT'-5) is shown in Table 2.

Ex. 15

16 g of surface-modified metal oxide particles (AZ'-9) were obtained in the same manner as in Ex. 1 except that 2-propanol was used instead of ethanol.

The proportions of the two types of the first surface-modifying groups were obtained in the same manner as in Ex. 1. The composition of the surface-modified metal oxide particles (AZ'-9) is shown in Table 3.

Ex. 16

16 g of surface-modified metal oxide particles (AZ'-10) were obtained in the same manner as in Ex. 1 except that the amount of compound (A10-1) charged was 7.5 g, the amount of compound (A10-2) charged was 16.6 g, and 2-propanol was used instead of ethanol.

The proportions of the two types of the first surface-modifying groups were obtained in the same manner as in Ex. 1. The composition of the surface-modified metal oxide particles (AZ'-10) is shown in Table 3.

Ex. 17

33 g of the aqueous dispersion of metal oxide particles (Z) was put in a 500 mL beaker, and 167 g of 2-propanol and 84 g of compound (B-1) were added. 12.0 g of compound (A10-1), 3.8 g of compound (A10-2) and 1.5 g of compound (A20-1) were added with stirring by a magnetic stirrer, and stirring was continued at room temperature for 3 days. An azeotropic mixture of 2-propanol and water was removed by an evaporator, and the mixture was concentrated until the liquid amount became 100 mL to obtain a concentrate. 500 mL of hexane was put in a 1 L beaker, and the concentrate was added thereto over a period of 10 minutes with stirring by a magnetic stirrer, whereupon the mixture was clouded. Stirring was continued at room temperature for one day, and the precipitate was recovered by a filter and washed with 500 mL of hexane to obtain 28 g of a white solid containing hexane and water.

The obtained white solid was put in a 500 mL eggplant flask, a stirrer chip and 300 g of methyl isobutyl ketone (MIBK) were added, and a Dean-Stark dehydrator was attached, followed by heating in an oil bath to 130° C. with stirring. The transparency of the liquid in the flask increased as water was removed, and 2 hours later, at a point where water was no more removed, 1 g of triethylamine (manufactured by Tokyo Chemical Industry Co., Ltd.) was added, whereupon a highly transparent dispersion liquid was obtained one minute later. After cooling, volatile content was distilled off from the dispersion liquid to evaporate it to dryness by an evaporator, followed by drying in a vacuum dryer at 70° C. for 18 hours to obtain 16 g of a powder of surface-modified oxide fine particles (AZ-11).

Ex. 18

18 g of surface-modified metal oxide particles (AZ-12) were obtained in the same manner as in Ex. 17 except that the amount of compound (A10-1) charged was 7.5 g, and the amount of compound (A10-2) charged was 16.6 g.

The proportions of the two types of the first surface-modifying groups and the proportion of the second surface-modifying groups were obtained in the same manner as in Ex. 1. The composition of the surface-modified metal oxide particles (AZ-12) is shown in Table 3.

TABLE 1

| | | Composition of surface-modified metal oxide particles (mass %) | | | | | | |
|---|---|---|---|---|---|---|---|---|
| | | Ex. 1 | Ex. 2 | Ex. 3 | Ex. 4 | Ex. 5 | Ex. 6 | Ex. 7 |
| Surface-modified metal oxide particles (A) | | (AZ'-1) | (AZ'-2) | (AZ'-3) | (AZ'-4) | (AZ'-5) | (AZ'-6) | (AZ'-7) |
| Metal oxide particles | (Z) | 59.0 | 57.0 | 43.0 | 45.0 | 52.0 | 53.0 | 53.0 |
| | (T) | — | — | — | — | — | — | — |
| First surface-modifying groups | Derived from compound (A10-1) | 37.1 | 21.2 | 51.2 | 27.7 | 42.8 | 40.9 | 38.1 |
| | Derived from compound (A10-2) | 3.9 | 21.8 | 5.8 | 27.3 | — | — | 6.7 |
| Second surface-modifying groups | Derived from compound (A20-1) | — | — | — | — | 5.2 | — | 2.2 |
| | Derived from compound (A20-2) | — | — | — | — | — | 6.1 | — |

TABLE 2

| | | Composition of surface-modified metal oxide particles (mass %) | | | | | | |
|---|---|---|---|---|---|---|---|---|
| | | Ex. 8 | Ex. 9 | Ex. 10 | Ex. 11 | Ex. 12 | Ex. 13 | Ex. 14 |
| Surface-modified metal oxide particles (A) | | (AZ'-8) | (AT'-1) | (AT'-2) | (AT'-3) | (AT'-4) | (AZ'-13) | (AT'-5) |
| Metal oxide particles | (Z) | 49.0 | — | — | — | 50.0 | 50.0 | — |
| | (T) | — | 55.0 | 54.0 | 45.0 | — | — | 55.0 |
| First surface-modifying groups | Derived from compound (A10-1) | 25.6 | 40.1 | 23.5 | 49.5 | — | — | — |
| | Derived from compound (A10-2) | 23.5 | 4.9 | 22.5 | 4.2 | — | — | — |
| Second surface-modifying groups | Derived from compound (A20-1) | 1.9 | — | — | 2.1 | 50.0 | 50.0 | 45.0 |
| | Derived from compound (A20-2) | — | — | — | — | — | — | — |

Ex. 19

0.05 g of surface-modified metal oxide particles (AZ'-1) and 0.95 g of HCFC-225 were mixed, and ultrasonic irradiation was conducted by an ultrasonic homogenizer (manufactured by NIHONSEIKI KAISHA LTD., US-300T) at an oscillation frequency of 20 kHz for 2 hours to uniformly disperse the particles thereby to obtain a uniform dispersion liquid with a haze. In a case where the surface-modified metal oxide particles were agglomerated, the agglomerates may be disintegrated by conducting the above-described ultrasonic irradiation. Even after the dispersion liquid was left to stand at room temperature for one month, no deposition precipitated, and the transparency of the dispersion liquid was at such a level that the other side could be visible through it. The results of evaluation of the dispersion liquid are shown in Table 4.

Ex. 20

0.05 g of surface-modified metal oxide particles (AZ'-1), 0.95 g of compound (B-1) and 0.01 g of polymerization initiator (D-1) were mixed, and ultrasonic irradiation was conducted under the same conditions as in Ex. 19 to obtain a uniform curable composition with a haze. The results of evaluation of the curable composition are shown in Table 4.

Ex. 21, 23, 24, 29 and 31

A transparent uniform dispersion liquid was obtained by conducting ultrasonic irradiation under the same conditions as in Ex. 19 except that the type of the surface-modified metal oxide particles (A) was changed. The results of evaluation of the dispersion liquid are shown in Tables 4, 5 and 6.

Ex. 22, 25, 26, 30 and 32

A transparent uniform curable composition was obtained by conducting ultrasonic irradiation under the same conditions as in Ex. 19 except that the type of the surface-modified metal oxide particles (A) was changed. The results of evaluation of the curable composition are shown in Tables 4, 5 and 6.

Ex. 27

0.05 g of surface-modified metal oxide particles (AZ-7), 0.95 g of compound (B-2) and 0.01 g of polymerization initiator (D-1) were mixed, and ultrasonic irradiation was conducted under the same conditions as in Ex. 19 to obtain a transparent uniform curable composition. The results of evaluation of the curable composition are shown in Table 5.

Ex. 28 and 33

A transparent uniform curable composition was obtained by conducting ultrasonic irradiation under the same conditions as in Ex. 19 except that the type of the surface-modified metal oxide particles (A) was changed. The results of evaluation of the curable composition are shown in Tables 5 and 6.

Ex. 34

0.05 g of surface-modified metal oxide particles (AZ'-3), 0.05 g of surface-modified metal oxide particles (AT'-2) and 0.90 g of HCFC-225 were mixed, and ultrasonic irradiation was conducted under the same conditions as in Ex. 19 to obtain a transparent uniform dispersion liquid.

Ex. 35 and 36

In order to disperse 10 mass % of surface-modified metal oxide particles (AZ'-9) in 90 mass % of MIBK, ultrasonic irradiation was conducted under the same conditions as in Ex. 19, whereupon a transparent uniform dispersion liquid was obtained.

It was attempted to disperse 1 mass % of surface-modified metal oxide particles (AZ'-9) in 99 mass % of HCFC-225 (Ex. 35) or 99 mass % of compound (B-1) (Ex. 36), but the particles could not be dispersed in either of them, and ultrasonic irradiation was conducted under the same conditions as in Ex. 19 except that the irradiation time was changed to 15 hours, however, the surface-modified metal oxide particles (AZ'-9) remained precipitated.

Ex. 37 and 38

In order to disperse 10 mass % of surface-modified metal oxide particles (AT'-5) in 90 mass % of MIBK, ultrasonic irradiation was conducted under the same conditions as in Ex. 19, whereupon a transparent uniform dispersion liquid was obtained.

It was attempted to disperse 1 mass % of surface-modified metal oxide particles (AT'-5) in 99 mass % of HCFC-225 (Ex. 37) or 99 mass % of compound (B-1) (Ex. 38), but the particles could not be dispersed in either of them, and ultrasonic irradiation was conducted under the same conditions as in Ex. 19 except that the irradiation time was changed to 15 hours, however, the surface-modified metal oxide particles (AT'-5) remained precipitated.

TABLE 3

| | | Composition of surface-modified metal oxide particles (mass %) | | | |
|---|---|---|---|---|---|
| | | Ex. 15 | Ex. 16 | Ex. 17 | Ex. 18 |
| Surface-modified metal oxide particles (A) | | (AZ'-9) | (AZ'-10) | (AZ'-11) | (AZ'-12) |
| Metal oxide particles | (Z) | 60.0 | 44.0 | 54.0 | 40.0 |
| | (T) | — | — | — | — |
| First surface-modifying groups | Derived from compound (A10-1) | 36.3 | 29.6 | 39.1 | 30.9 |
| | Derived from compound (A10-2) | 3.7 | 26.4 | 5.7 | 27.1 |
| Second surface-modifying groups | Derived from compound (A20-1) | | | 1.2 | 2.0 |
| | Derived from compound (A20-2) | — | | | |

TABLE 4

| | | Ex. 19 | Ex. 20 | Ex. 21 | Ex. 22 | Ex. 23 |
|---|---|---|---|---|---|---|
| Surface-modified metal oxide particles (A) *1 | (AZ'-1) | 5 | 5 | — | — | — |
| | (AZ'-2) | — | — | 5 | 5 | — |
| | (AZ'-3) | — | — | — | — | 5 |
| | (AZ'-4) | — | — | — | — | — |

TABLE 4-continued

|  |  | Ex. 19 | Ex. 20 | Ex. 21 | Ex. 22 | Ex. 23 |
|---|---|---|---|---|---|---|
|  | (AZ-5) | — | — | — | — | — |
|  | (AZ-6) | — | — | — | — | — |
|  | (AZ-7) | — | — | — | — | — |
|  | (AZ-8) | — | — | — | — | — |
|  | (AZ'-9) | — | — | — | — | — |
|  | (AT'-1) | — | — | — | — | — |
|  | (AT'-2) | — | — | — | — | — |
|  | (AT-3) | — | — | — | — | — |
|  | (AT-4) | — | — | — | — | — |
|  | (AT'-5) | — | — | — | — | — |
| Fluorinated organic solvent [*1] | HCFC-225 | 95 | — | 95 | — | 95 |
| Compound (B) [*1] | (B-1) | — | 95 | — | 95 | — |
|  | (B-2) | — | — | — | — | — |
| Polymerization initiator (D) [*2] | (D-1) | — | 1 | — | 1 | — |
| Curable composition | 25° C. viscosity (mPa · s) | — | 20 | — | 21 | — |
| Dispersion liquid or curable composition | Refractive index (589 nm) | 1.371 | 1.399 | 1.369 | 1.401 | 1.386 |
|  | Abbe number | 61 | 60 | 62 | 61 | 62 |
| Cured product | Refractive index (589 nm) | — | 1.411 | — | 1.418 | — |
|  | Abbe number | — | 60 | — | 60 | — |
| Transmittance (600 nm) of dispersion liquid (%): optical path length 10 mm | | 80 | — | 83 | — | 85 |
| Thickness of cured product for evaluation (μm) | | — | 40 | — | 39 | — |
| Transmittance (600 nm) of cured product for evaluation (%) | | — | 87 | — | 90 | — |

[*1] mass % based on 100 mass % of the total amount of (A) and the fluorinated organic solvent or (B).
[*2] part by mass based on 100 parts by mass of the total amount of (A) and the fluorinated organic solvent or (B).

TABLE 5

|  |  | Ex. 24 | Ex. 25 | Ex. 26 | Ex. 27 | Ex. 28 |
|---|---|---|---|---|---|---|
| Surface-modified metal oxide particles (A) [*1] | (AZ'-1) | — | — | — | — | — |
|  | (AZ'-2) | — | — | — | — | — |
|  | (AZ'-3) | — | — | — | — | — |
|  | (AZ'-4) | 5 | — | — | — | — |
|  | (AZ-5) | — | 5 | — | — | — |
|  | (AZ-6) | — | — | 5 | — | — |
|  | (AZ-7) | — | — | — | 5 | — |
|  | (AZ-8) | — | — | — | — | 5 |
|  | (AZ'-9) | — | — | — | — | — |
|  | (AT'-1) | — | — | — | — | — |
|  | (AT'-2) | — | — | — | — | — |
|  | (AT-3) | — | — | — | — | — |
|  | (AT-4) | — | — | — | — | — |
|  | (AT'-5) | — | — | — | — | — |
| Fluorinated organic solvent [*1] | HCFC-225 | 95 | — | — | — | — |
| Compound (B) [*1] | (B-1) | — | 95 | 95 | — | — |
|  | (B-2) | — | — | — | 95 | 95 |
| Polymerization initiator (D) [*2] | (D-1) | — | 1 | 1 | 1 | 1 |
| Curable composition | 25° C. viscosity (mPa · s) | — | 18 | 19 | 20 | 17 |
| Dispersion liquid or curable composition | Refractive index (589 nm) | 1.381 | 1.394 | 1.400 | 1.401 | 1.397 |
|  | Abbe number | 65 | 61 | 60 | 61 | 61 |
| Cured product | Refractive index (589 nm) | — | 1.413 | 1.420 | 1.409 | 1.405 |
|  | Abbe number | — | 60 | 61 | 61 | 60 |
| Transmittance (600 nm) of dispersion liquid (%): optical path length 10 mm | | 85 | — | — | — | — |
| Thickness of cured product for evaluation (μm) | | — | 39 | — | 40 | 42 |
| Transmittance (600 nm) of cured product for evaluation (%) | | — | 86 | — | 90 | 91 |

[*1] mass % based on 100 mass % of the total amount of (A) and the fluorinated organic solvent or (B).
[*2] part by mass based on 100 parts by mass of the total amount of (A) and the fluorinated organic solvent or (B).

TABLE 6

|  |  | Ex. 29 | Ex. 30 | Ex. 31 | Ex. 32 | Ex. 33 |
|---|---|---|---|---|---|---|
| Surface-modified metal oxide particles (A) *1 | (AZ'-1) | — | — | — | — | — |
|  | (AZ'-2) | — | — | — | — | — |
|  | (AZ'-3) | — | — | — | — | — |
|  | (AZ'-4) | — | — | — | — | — |
|  | (AZ-5) | — | — | — | — | — |
|  | (AZ-6) | — | — | — | — | — |
|  | (AZ-7) | — | — | — | — | — |
|  | (AZ-8) | — | — | — | — | — |
|  | (AZ'-9) | — | — | — | — | — |
|  | (AT'-1) | 5 | 5 | — | — | — |
|  | (AT'-2) | — | — | 5 | 5 | — |
|  | (AT-3) | — | — | — | — | 5 |
|  | (AT-4) | — | — | — | — | — |
|  | (AT'-5) | — | — | — | — | — |
| Fluorinated organic solvent *1 | HCFC-225 | 95 | — | 95 | — | — |
| Compound (B) *1 | (B-1) | — | 95 | — | 95 | — |
|  | (B-2) | — | — | — | — | 95 |
| Polymerization initiator (D) *2 | (D-1) | — | 1 | — | 1 | 1 |
| Curable composition | 25° C. viscosity (mPa · s) | — | 25 | — | 20 | 24 |
| Dispersion liquid or curable composition | Refractive index (589 nm) | 1.399 | 1.405 | 1.401 | 1.406 | 1.402 |
|  | Abbe number | 60 | 58 | 60 | 59 | 60 |
| Cured product | Refractive index (589 nm) | — | 1.421 | — | 1.421 | 1.425 |
|  | Abbe number | — | 59 | — | 59 | 59 |
| Transmittance (600 nm) of dispersion liquid (%): optical path length 10 mm |  | 75 | — | 78 | — | — |
| Thickness of cured product for evaluation (µm) |  | — | 41 | — | 40 | 44 |
| Transmittance (600 nm) of cured product for evaluation (%) |  | — | 76 | — | 79 | 82 |

*1 mass % based on 100 mass % of the total amount of (A) and the fluorinated organic solvent or (B).
*2 part by mass based on 100 parts by mass of the total amount of (A) and the fluorinated organic solvent or (B).

In Ex. 19 to 35, since the dispersion liquid or the curable composition contains surface-modified metal oxide particles having specific fluoroalkyl group-containing surface-modifying groups, it has a high Abbe number and is excellent in transparency. However, in Ex. 19 to 24, and 29 to 32, since the surface-modified metal oxide particles contain no specific (meth)acryloyl group-containing surface-modifying groups, the curing property tends to be poor.

In Ex. 37 and 38, since the surface-modified metal oxide particles contain no fluoroalkyl group-containing surface-modifying groups, they had poor compatibility with a fluorinated compound, they were not uniformly dispersed in the fluorinated compound, transparency tends to be poor.

INDUSTRIAL APPLICABILITY

The surface-modified metal oxide particles, the dispersion liquid and the curable composition of the present invention are useful as a material to be used for an optical member (such as a lens, a prism, an antireflection film, an optical waveguide, an LED sealing material, etc.), a recording medium, semiconductor device production, etc.

This application is a continuation of PCT Application No. PCT/JP2016/088514, filed on Dec. 22, 2016, which is based upon and claims the benefit of priority from Japanese Patent Application No. 2015-254093 filed on Dec. 25, 2015. The contents of those applications are incorporated herein by reference in their entireties.

What is claimed is:
1. Surface-modified metal oxide particles, comprising:
a metal oxide particle having a refractive index of at least 1.9 to light having a wavelength of 589 nm;
a first surface-modifying group having a group represented by formula (A1) and being attached to a surface of the metal oxide particle by reaction with hydroxy groups on the surface of the metal oxide particle; and
a second surface-modifying group having a group represented by formula (A2) and being attached to the surface of the metal oxide particle by reaction with hydroxy groups on the surface of the metal oxide particle:

$$C_nF_mH_{2n+1-m}\text{—SiR}^1{}_a(\text{—}*)_{3-a} \quad (A1)$$

wherein * is a binding site of Si to the metal oxide particle, $R^1$ is a hydrogen atom or a $C_{1-4}$ hydrocarbon group, n is an integer of from 1 to 20, m is an integer of at least 3 and at most (2n+1), and a is an integer of from 0 to 2, provided that when a is 2, two $R^1$s are the same or different;

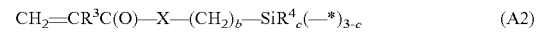

$$CH_2\!=\!CR^3C(O)\text{—}X\text{—}(CH_2)_b\text{—}SiR^4{}_c(\text{—}*)_{3-c} \quad (A2)$$

wherein * is a binding site of Si to the metal oxide particle, $R^3$ is a hydrogen atom or a methyl group, $R^4$ is a hydrogen atom or a $C_{1-4}$ hydrocarbon group, X is —O— or —NH—, b is an integer of from 2 to 10, and c is an integer of from 0 to 2, provided that when c is 2, two $R^4$s are the same or different.

2. The surface-modified metal oxide particles according to claim 1, wherein based on 100 mass % of the surface-modified metal oxide particles, a proportion of the metal oxide particle is from 20 to 84 mass %, and a proportion of a total amount of the first surface-modifying group and the second surface-modifying group is from 16 to 80 mass %.

3. The surface-modified metal oxide particles according to claim 1, wherein based on 100 mass % of the surface-modified metal oxide particles, a proportion of the first surface-modifying group is from 15 to 55 mass %, and a proportion of the second surface-modifying group is from 1 to 25 mass %.

4. A method for producing the surface-modified metal oxide particles of claim 1, the method comprising:

surface-treating a surface of metal oxide particle having a refractive index of at least 1.9 to light having a wavelength of 589 nm, by reaction of hydroxy groups on the surface of the metal oxide particle with a compound represented by formula (A10) and a compound represented by formula (A20):

$$C_nF_mH_{2n+1-m}—SiR^1{}_a(OR^2)_{3-a} \quad (A10)$$

wherein $R^1$ is a hydrogen atom or a $C_{1-4}$ hydrocarbon group, n is an integer of from 1 to 20, m is an integer of at least 3 and at most (2n+1), a is an integer of from 0 to 2, provided that when a is 2, two $R^1$s are the same or different, and $R^2$ is a hydrogen atom or a $C_{1-10}$ hydrocarbon group, provided that when a is 0 or 1, three or two $R^2$s are the same or different;

$$CH_2=CR^3C(O)—X—(CH_2)_b—SiR^4{}_c(OR^5)_{3-c} \quad (A20)$$

wherein $R^3$ is a hydrogen atom or a methyl group, $R^4$ is a hydrogen atom or a $C_{1-4}$ hydrocarbon group, X is —O— or —NH—, h is an integer of from 2 to 10, and c is an integer of from 0 to 2, provided that when c is 2, two $R^4$s are the same or different, and $R^5$ is a hydrogen atom or a $C_{1-10}$ hydrocarbon group, provided that when c is 0 or 1, three or two $R^5$s are the same or different.

5. The method according to claim 4, wherein based on 100 mass % of a total amount of the compound represented by the formula (A10) and the compound represented by the formula (A20), a proportion of the compound represented by the formula (A10) is from 39 to 98 mass %, and a proportion of the compound represented by the formula (A20) is from 2 to 61 mass %.

6. The method according to claim 4, wherein a total amount of the compound represented by the formula (A10) and the compound represented by the formula (A20) is from 65 to 1,360 parts by mass based on 100 parts by mass of the metal oxide particle.

7. A dispersion liquid comprising:

the surface-modified metal oxide particles as defined in claim 1; and a fluorinated compound which has a fluorine atom content of at least 20 mass % and which is liquid at 25° C., wherein based on 100 mass % of a total amount of the surface-modified metal oxide particles and the fluorinated compound, a proportion of the surface-modified metal oxide particles is from 1 to 90 mass % and a proportion of the fluorinated compound is from 10 to 99 mass %.

8. The dispersion liquid according to claim 7, which has an Abbe number of at least 58 as determined from formula (I) and has a transmittance of at least 40% to light having a wavelength of 600 nm:

$$\nu_D=(n_D-1)/(n_F-n_C) \quad (I)$$

wherein $\nu_D$ is the Abbe number, $n_D$ is the refractive index to light having a wavelength of 589 nm, $n_F$ is the refractive index to light having a wavelength of 486 nm, and $n_C$ is the refractive index to light having a wavelength of 656 nm.

9. A curable composition comprising: the surface-modified metal oxide particles (A) as defined in claim 1;

a compound (B) having a fluorine atom content of at least 20 mass % and having at least one (meth)acryloyl group, the compound (B) being other than the surface-modified metal oxide particles (A)); and a polymerization initiator (D), wherein based on 100 mass % of a total amount of the surface-modified metal oxide particles (A) and all compounds having a (meth)acryloyl group excluding the surface-modified metal oxide particles (A), a proportion of the surface-modified metal oxide particles (A) is from 1 to 90 mass %, and a proportion of the compound (B) is from 10 to 99 mass %, and wherein based on 100 parts by mass of a total amount of the surface-modified metal oxide particles (A) and all compounds having a (meth)acryloyl group excluding the surface-modified metal oxide particles (A), an amount of the polymerization initiator (D) is from 0.01 to 10 parts by mass.

10. The curable composition according to claim 9, further comprising:

a compound (C) having at least one (meth)acryloyl group, the compound (C) being other than the surface-modified metal oxide particles (A) or the compound (B), and wherein based on 100 mass % of a total amount of all compounds having a (meth)acryloyl group including the particles (A), a proportion of the surface-modified metal oxide particles (A) is from 1 to 89 mass %, a proportion of the compound (B) is from to 98 mass %, and a proportion of the compound (C) is from 1 to 50 mass %.

11. The curable composition according to claim 10, wherein the compound (C) is a compound (C1) having one (meth)acryloyloxy group or a compound (C2) having two or more (meth)acryloyloxy groups, each of the compounds (C1) and (C2) is other than surface-modified metal oxide particles (A) or the compound (B).

12. The curable composition according to claim 9, wherein the compound (B) is a fluoro(meth)acrylate.

13. A cured product of the curable composition as defined in claim 9.

* * * * *